United States Patent [19]

Gatto

[11] Patent Number: 5,158,781
[45] Date of Patent: Oct. 27, 1992

[54] TRACTION APPARATUS FOR TUBULAR MATERIAL

[75] Inventor: Charles Gatto, Nassau County, N.Y.

[73] Assignee: The Conair Group, Inc., Pittsburgh, Pa.

[21] Appl. No.: 687,974

[22] Filed: Apr. 19, 1991

Related U.S. Application Data

[63] Continuation of Ser. No. 467,262, Mar. 21, 1990, abandoned, which is a continuation of Ser. No. 317,840, Mar. 2, 1989, abandoned.

[51] Int. Cl.$^5$ .............................................. B29C 47/34
[52] U.S. Cl. .................................. 425/135; 226/172; 226/173; 226/174; 226/178; 264/40.1; 264/40.7; 264/209.1; 425/162; 425/377
[58] Field of Search .................. 264/40.1, 40.7, 209.1, 264/211.12; 425/135, 162, 377; 226/10, 24, 42, 168, 170, 171, 172, 173, 174, 178, 188

[56] References Cited

U.S. PATENT DOCUMENTS 3,620,432 11/1971 Emery .................................. 226/172
4,882,104 11/1989 Dobrowsky ........................ 264/40.1

*Primary Examiner*—Leo B. Tentoni
*Attorney, Agent, or Firm*—Buchanan Ingersoll

[57] ABSTRACT

Apparatus for handling large diameter horizontally extruded plastic tubing includes a number of driven endless belts positioned around the path of travel of the extrusion to transport the extrusion while it cools. The belts are individually driven either by hydraulic or electric motors, the speed of travel of each belt is continuously monitored and a feedback system including a microprocessor controls the driving motors so as to maintain the speed of travel of the extrusion at an adjustable controlled value. The belt positions are hydraulically controlled to accommodate tubing of a range of sizes and the level of the hydraulic fluid in its reservoir, its pressure and its temperature are also monitored by the microprocessor. In the event of component fault or failure, the microprocessor returns the affected belt or belts to manual control so that the product line need not be shut down.

2 Claims, 6 Drawing Sheets

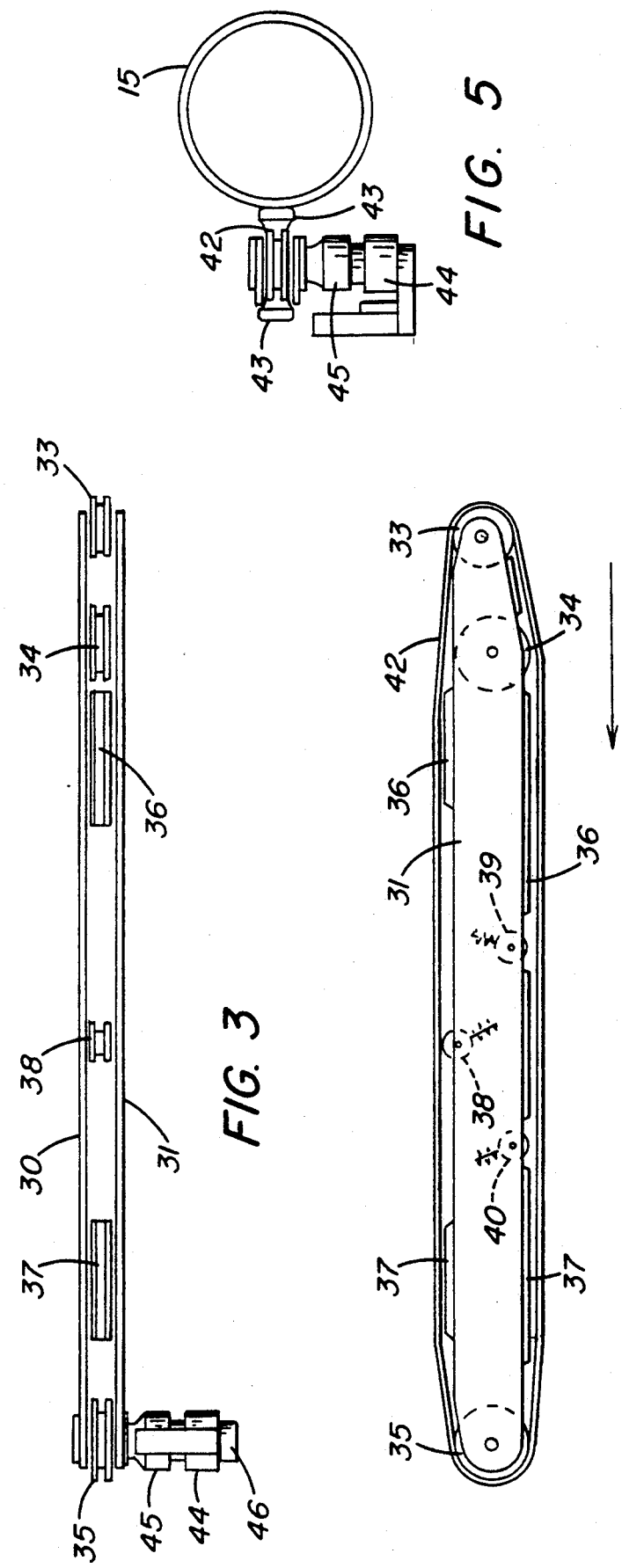

TRACTION APPARATUS FOR TUBULAR MATERIAL

RELATED APPLICATION

This application is a continuation of my U.S. application Ser. No. 467,262 filed Mar. 21, 1990, now abandoned, which in turn is a continuation of my U.S. application Ser. No. 317,840 filed Mar. 2, 1989, now abandoned.

BACKGROUND OF THE INVENTION

Tubing of plastic material is conventionally formed by charging plastic material in solid particle form into an extruder where it is melted and extruding the plastic material through a die in the form of a tube which is then carried by traction apparatus while it cools. The extruding press and the extruding operation form no part of my invention and will not be discussed hereinafter.

The manufacture of large diameter extruded tubing on the order of 20" and up presents problems not found in the production of small diameter extruded tubing. The large diameter tubing is difficult to extrude at a uniform rate and its wall thickness tends to vary. The handling of the cooling extruded material by traction apparatus is critical, and has prompted attempts at automation. The transport speed of my apparatus is automatically controlled. Because of the considerable volume of the material the apparatus must handle, it is highly undesirable to shut down the traction apparatus because of the occurrence of a fault or failure of some of its components. In that event, my apparatus to be described hereinafter returns the disabled portion to conventional manual control, so avoiding line shutdown.

SUMMARY OF THE INVENTION

The apparatus of my invention includes traction beams carrying endless traction belts defining the path of travel of the extruded tubing, a hydraulic or electrical servo drive for each belt, electrical means for determining the condition of the hydraulic fluid and for controlling the speed of each drive, and feedback means including a microprocessor for adjusting those speeds so as to maintain constant the diameter and wall thickness of the extruded tubing. The positions of the traction beams are adjustable so as to accommodate tubing of different diameters. The traction belts are provided with cleats which engage the surface of the extruded tube and either urge the tubing away from the extruder or retard its exit as required. In the event of a fault or failure affecting one or more of the traction belts, the microprocessor returns those traction belts to conventional manual control.

BRIEF DESCRIPTION OF DRAWINGS

FIG. 3 is a plan of a traction beam shown in outline in FIG. 1.

FIG. 4 is a side elevational of the traction beam of FIG. 3.

FIG. 5 is an end elevation of the beam of FIG. 3.

DESCRIPTION OF FIRST PREFERRED EMBODIMENT

Figure 2:
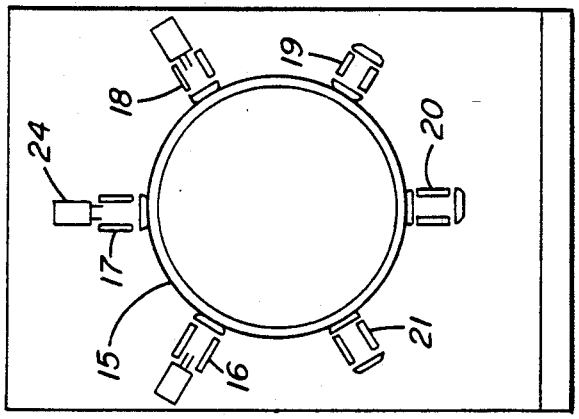
FIG. 2 is a vertical cross section of the apparatus of FIG. 1 taken on the plane 1—1.
Figure 1:
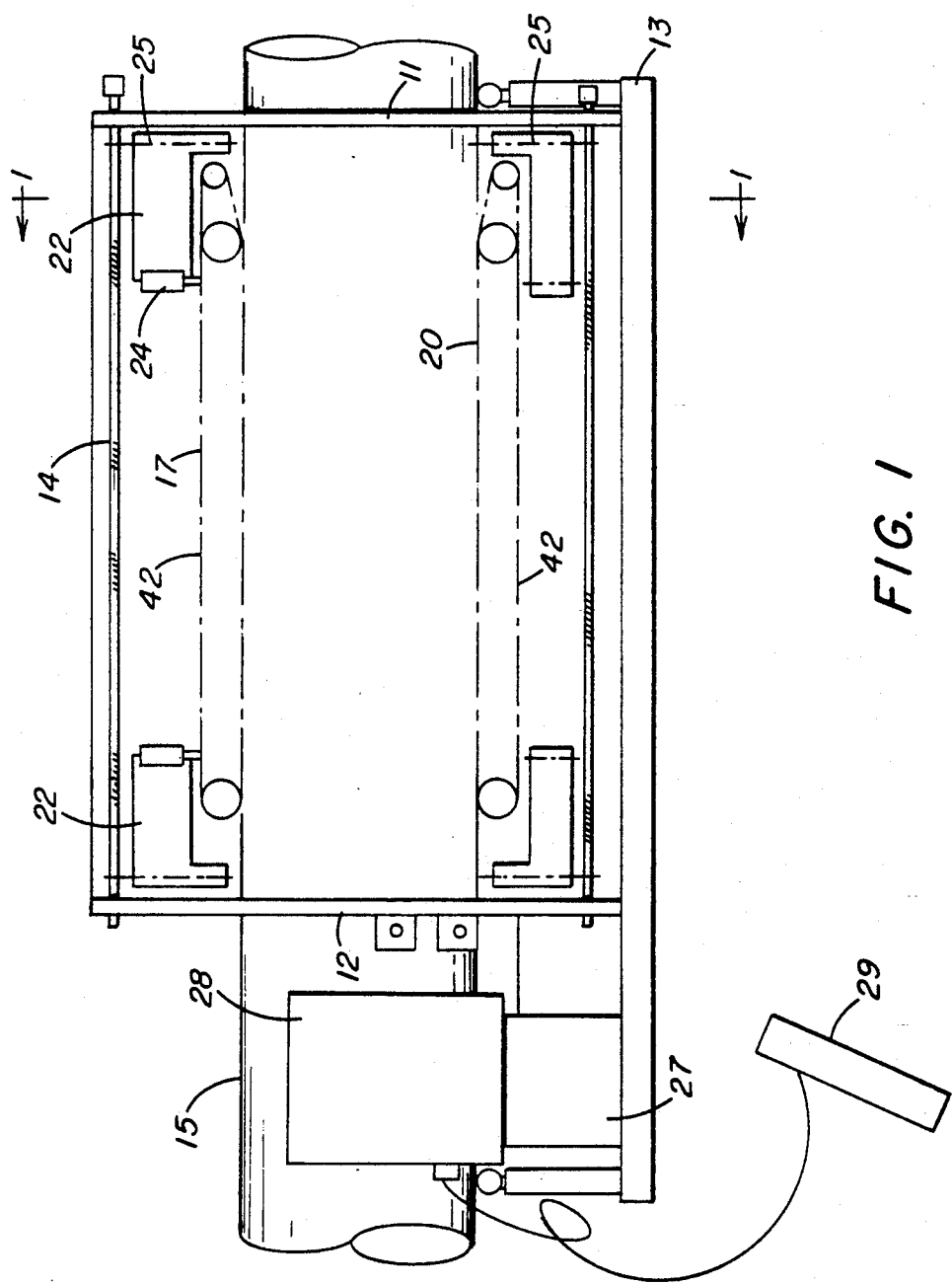
FIG. 1 is a side elevation of my apparatus.

My traction apparatus assembly is illustrated in FIGS. 1 and 2, FIG. 1 showing the relative position of my apparatus with respect to an extruder and its cooling tank. My apparatus comprises a pair of upstanding end plates 11 and 12 affixed to a base 13 spaced from each other. The upper ends of plates 11 and 12 are connected by one or more horizontal braces 14 so as to form a framework or cage. Each end plate is formed with a central cutout of sufficient size to accommodate a tubular extrusion 15 of the largest diameter contemplated. Disposed between end plates 11 and 12 are endless belts 42 mounted on traction beams as are better seen in FIG. 2, positioned parallel to the center line of extrusion 15. In FIG. 2, six such beams and endless belt assemblies are shown,, numbered 16 through 21 respectively. The number of such assemblies will depend on the size of the extrusion to be accommodated. The assemblies to be described in detail hereinafter are supported at each end on brackets 22 which are radially adjustable on vertical shaft 25 so that they can accommodate tubular extrusions of different diameters. Each assembly 16, 17 and 18 is mounted on its brackets 22 by a hydraulic clamp 24. Outside of extrusion cage end plate 12 is mounted a hydraulic tank and pump 27 and a control console 28 to be described hereinafter. Console 28 may be fitted with a remote control box 29.

The traction beam and belt assemblies are shown in FIGS. 3, 4 and 5. Each assembly comprises a pair of elongated members 30 and 31 spaced from each other. At its entry end each assembly houses an entry sprocket 33 and a follower sprocket 34 offset from sprocket 33 to facilitate the entry of an extruded tube. At its exit end each assembly has an exit sprocket 35. On its upper and lower surface each assembly supports a chain guide 36 adjoining a sprocket 34 and a chain guide 37 adjoining a sprocket 35. Those guides are preferably made of plastic such as polyethylene.

On its upper surface each assembly also supports a spring-loaded guide sprocket 38, and on its lower edge intermediate sprockets 34 and 35 are spring-loaded guide sprockets 39 and 40, one on each side of sprocket 38. Around sprockets 33 and 35 and over sprockets 34, 38, 39 and 40 and guides 36 and 37 is looped a chain 42 carrying rubber cleats 43 as shown most clearly in FIG. 5, which cleats bear against the extruded tube. Each rear sprocket 35 is driven by its own hydraulic motor 44, as will he described, through a speed reducer 45. Affixed to the common shaft of the sprocket and its motor is a drive logic element and encoder 46 to be described in more detail hereinafter.

Figure 6:
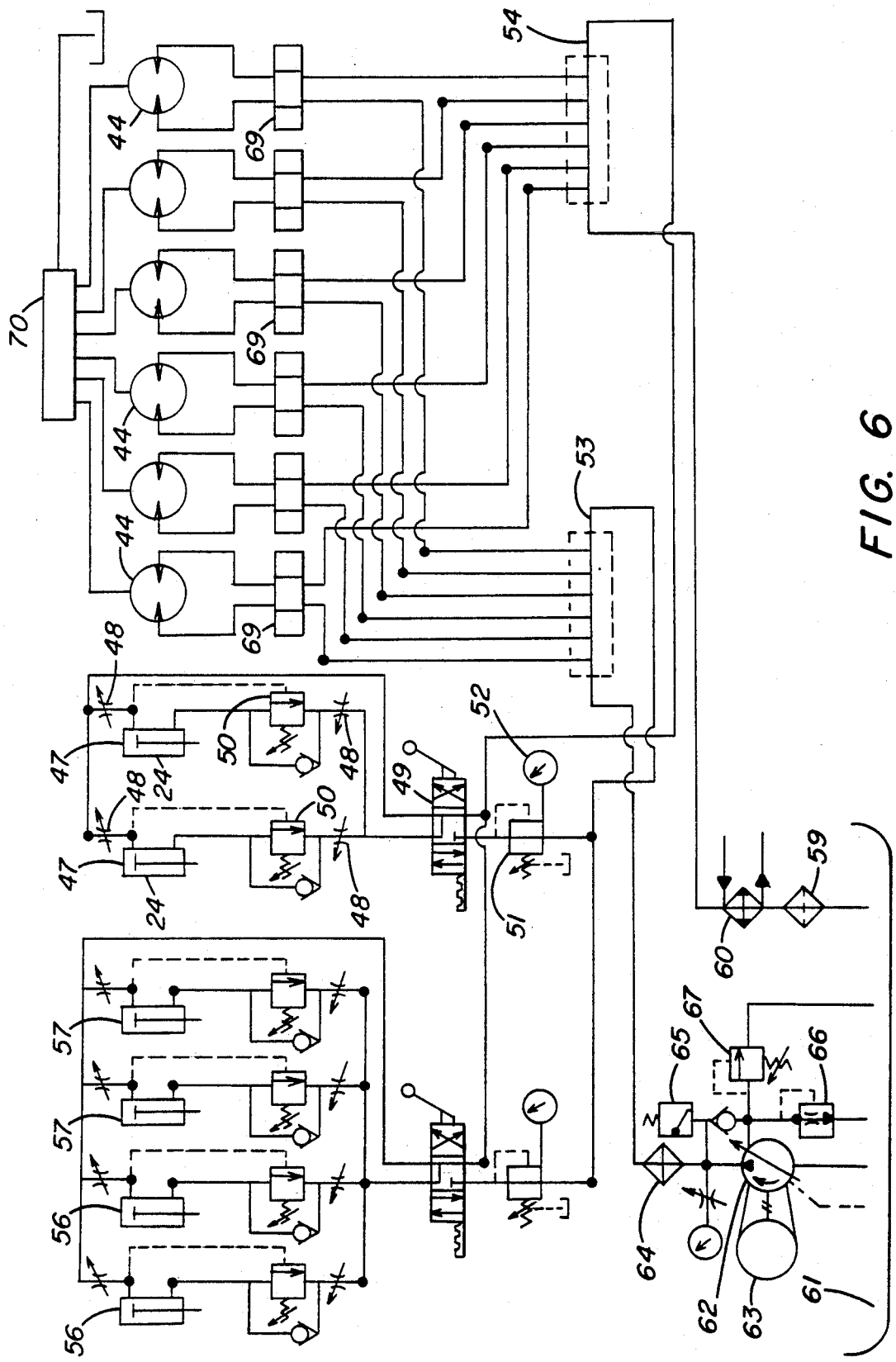
FIG. 6 is a schematic of the hydraulic system of my apparatus when utilizing hydraulic drive.

In FIG. 6 it will be seen that the two identical clamp cylinders 24 which clamp the two ends of top assembly 17 are connected at each end through flow control valves 48 to a manually controlled reversing valve 49 by which the operator positions the assembly 47 against a plastic extrusion 15. In circuit with each pair of valves 48 is a spring-loaded holding valve 50 which prevents assembly 17 from "creeping" into the work area when the control system is turned off. Hydraulic fluid from supply manifold 53 is piped through pressure reducing valve 51 with pressure gauge 52 into valve 49 above mentioned. The return from valve 49 is piped into the hydraulic fluid return manifold 54.

Side assembly 16 and side assembly 18 are also equipped with clamp cylinders at each end 56-56 and 57-57 respectively and hydraulic control circuits identical with those above-described for clamp cylinders 24 and 24, connecting them to hydraulic fluid supply manifold 53 and hydraulic return manifold 54. Each beam assembly has its own hydraulic drive motor 44 for its belt 42. The six motors are identical and have identical control circuits, only one of which will be described. Hydraulic fluid from return manifold 54 is piped through heat exchanger 60 and water-cooled therein; filtered in filter 59 and discharged into sump 61. From there it is pumped by pump 62, driven by motor 63., through a second filter 64 into supply manifold 53. A pressure switch 65 monitors the pump output for low pressure. A "soft start" valve 66 allows pump 62 to start up smoothly. Pressure reducing valve 67 allows the operator to adjust the pressure of the pump discharge. Hydraulic fluid from supply manifold 53 is pumped through speed control valve 69 to motor 44. Speed control valve 69 regulates the flow of hydraulic fluid from supply manifold 53, to the motor 44. Spent fluid is returned through the valve to the return manifold 54. Internal motor leakage is routed to case drain manifold 70 which then is returned to the main reservoir 61.

Figure 7:
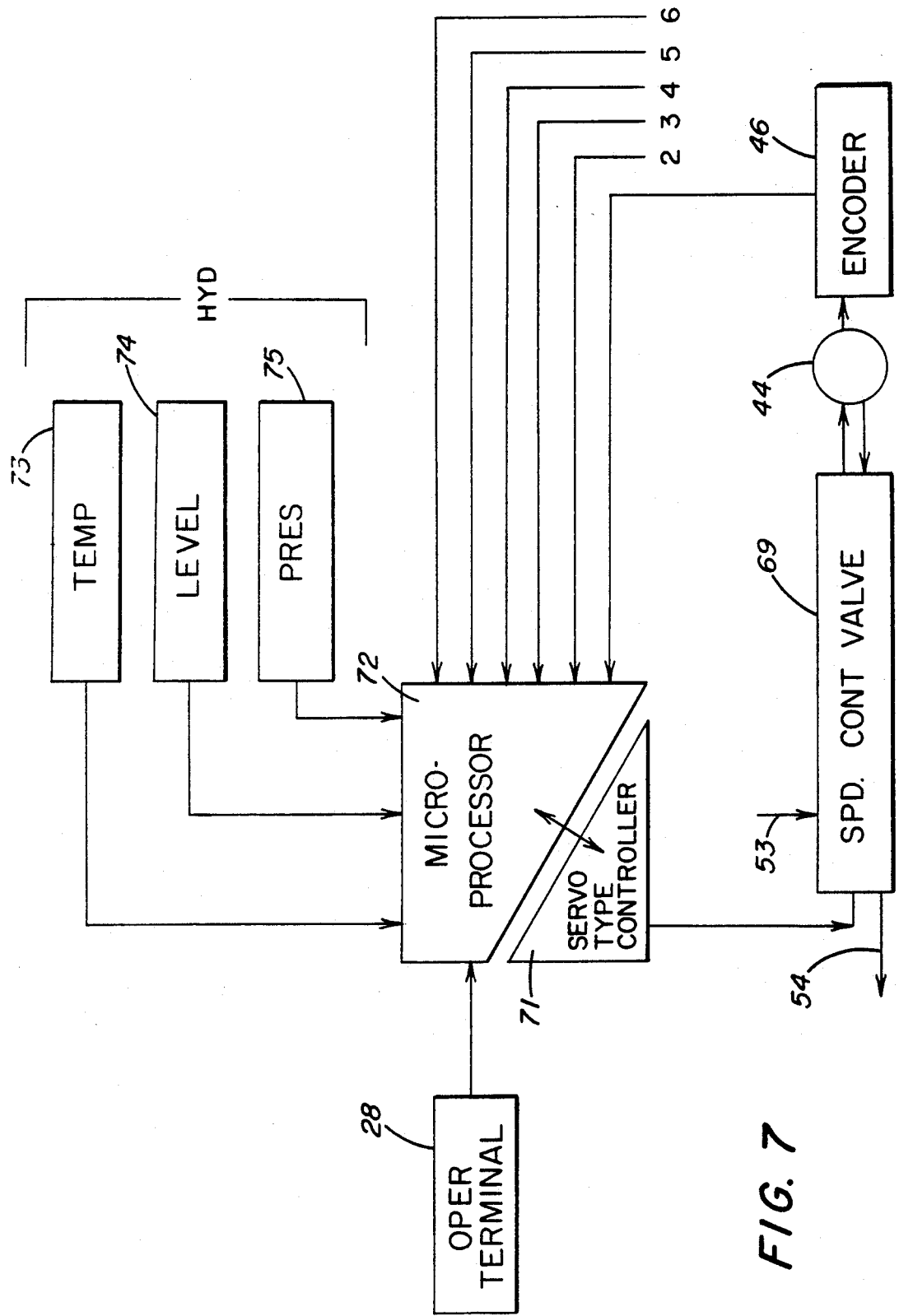
FIG. 7 is a block diagram of the electrical system of my apparatus when utilizing hydraulic drive.

Each valve 69 is controlled by a separate channel or unit of a conventional servo control device 71, as is shown in FIG. 7. That device, which provides relatively coarse control is, in turn, more precisely controlled by microprocessor 72 which receives input from each encoder 46 as well as fault signals from means 73, 74 and 75 indicating temperature, level and pressure, respectively, of the hydraulic supply. Each motor 44 operates at a speed controlled at the same nominal value by its control valve 69, by conventional feedback therefrom. Each encoder 46 signals its motor speed and, therefore, belt speed to microprocessor 72. If one or more encoded signals indicate that the motor 44 from which it originates is not operating at the nominal speed set by operator terminal 28, the microprocessor disables the appropriate channel or unit of servo controller 71, allowing the speed of the affected motor 44 to be controlled manually. Likewise, if the microprocessor receives a fault signal as above mentioned, it disables all channels or units of the servo controller 71, allowing the speed of the various belts to be manually controlled. In this way, complete shutdown of my apparatus can be avoided.

DESCRIPTION OF SECOND PREFERRED EMBODIMENT

Figure 9:
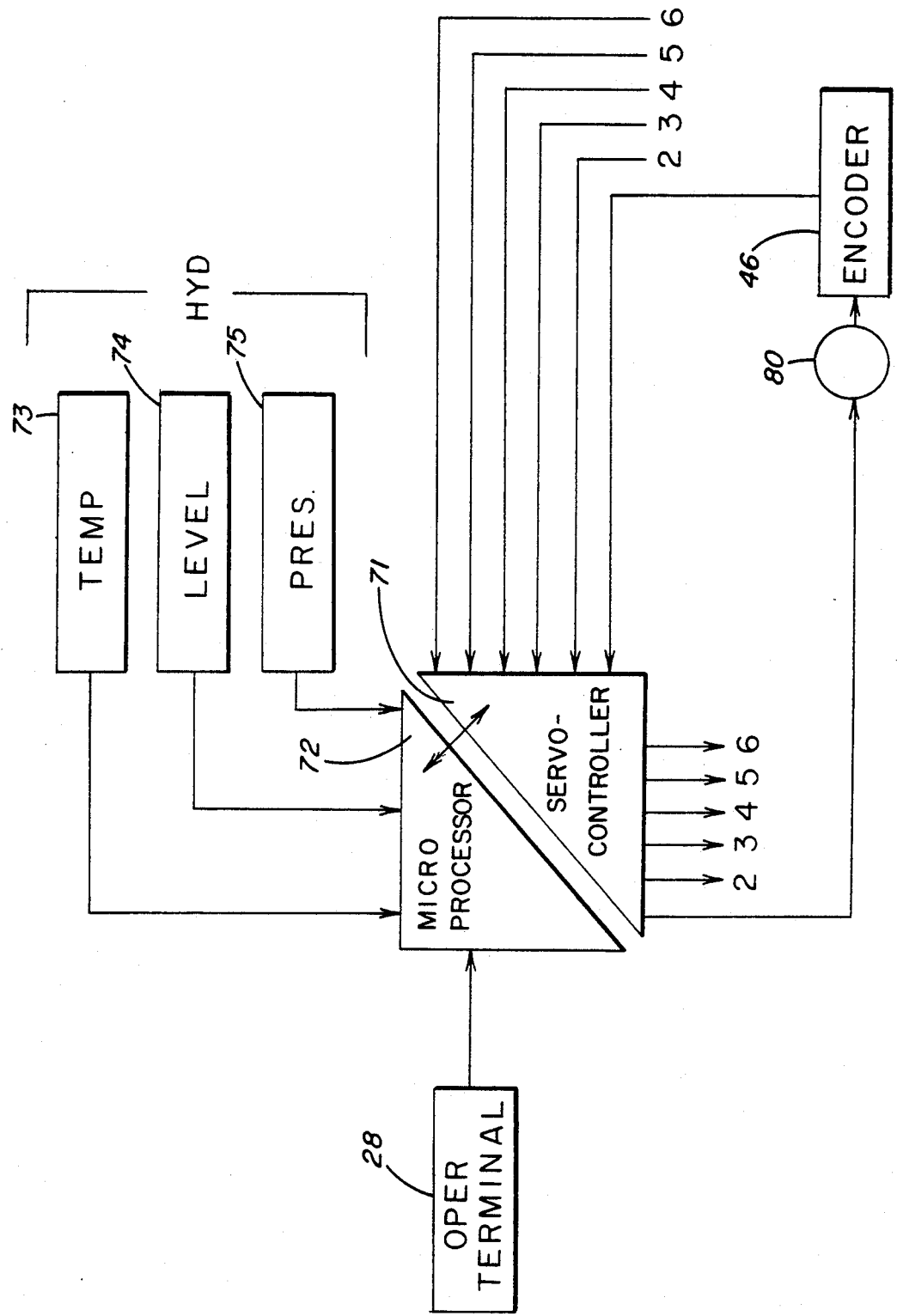
FIG. 9 is a block diagram of the electrical system of my apparatus when utilizing electrical servo drive.

FIGS. 1 through 5 referred to hereinabove also illustrate my second preferred embodiment, with a single exception. Drive motors 44 for each traction belt there indicated to be hydraulic motors, are replaced by servoelectric motors 80, as is shown in FIG. 9, the controls for which will be described hereinafter. The traction belts 16 through 21 are clamped in position by hydraulic means as before.

Figure 8:
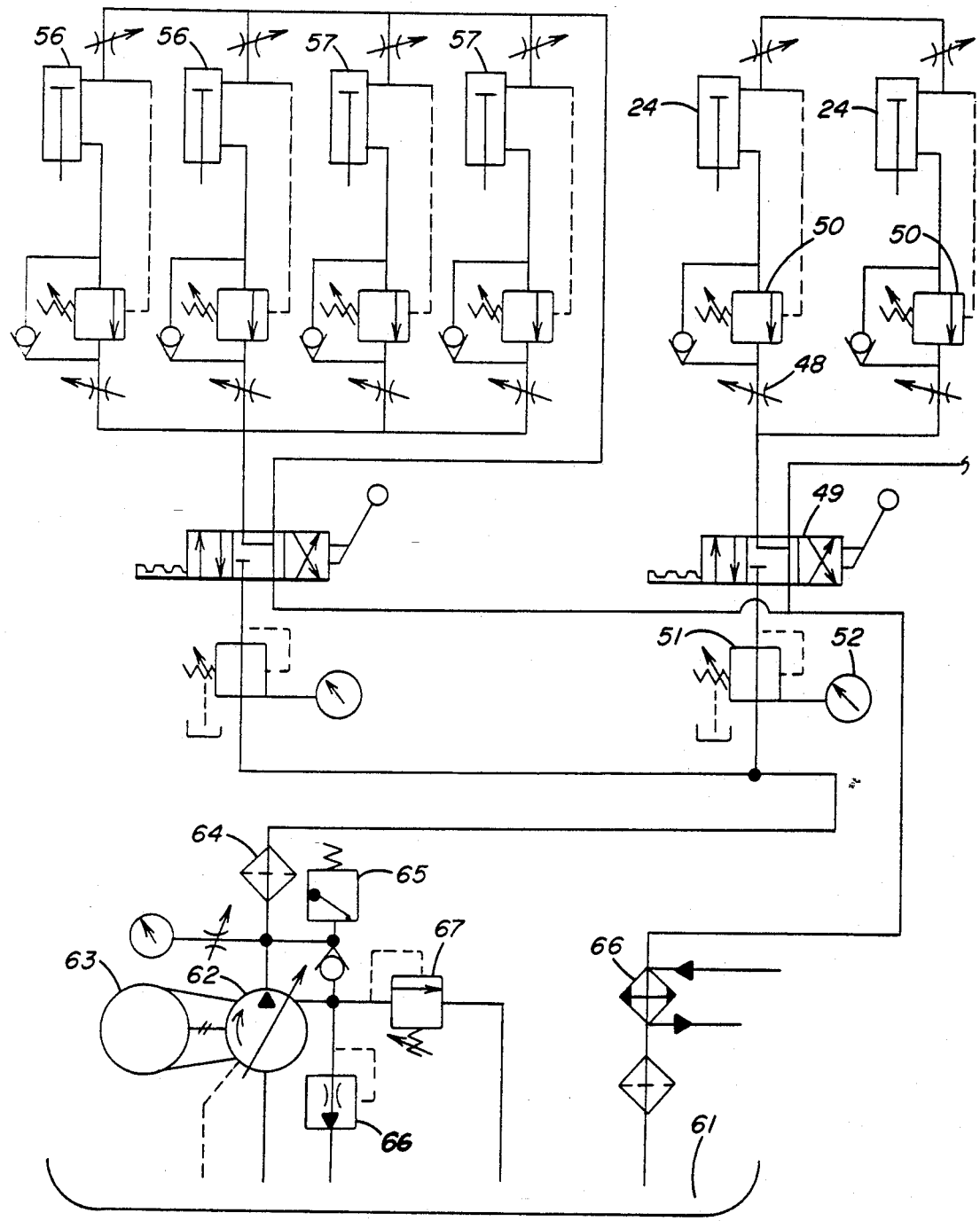
FIG. 8 is a schematic of the hydraulic system of my apparatus when utilizing electrical servo drive.

FIG. 8 shows the hydraulic circuit for that purpose, which differs from the hydraulic clamping portion of FIG. 6 only in that the hydraulic fluid from sump 61 is introduced by pump 62 through filter 64 directly to pressure reducing means 51, and the discharge from reversing valve 49 goes directly back to sump 61 through heat exchanger 60.

The control circuit for my second preferred embodiment is shown in FIG. 9. As before, a servo controller 71 and a microprocessor 72 are employed, coupled together. As before, fault signals for temperature, hydraulic fluid level and hydraulic fluid pressure measuring means 73, 74 and 75, respectively, are transmitted to microprocessor 72. Each servo motor 80 drives its own encoder 46 which signals its motor speed to servo controller 71. That information is transferred to microprocessor 72 which utilizes it, together with the fault signals, if necessary, to regulate the speeds of the drive motors 80 so as to render uniform the travel of the extrusion. If one or more motors 80 is not operating at its regulated speed, microprocessor 72 through servo controller 71 switches the motor or motors over to manual control.

I claim:

1. An improved travelling belt traction apparatus for horizontally withdrawing plastic material through a die from an extruder so as to produce a continuous article of predetermined uniform cross section, said article having a periphery and a longitudinal axis extending in the direction of withdrawing, said apparatus having hydraulic fluid driven travelling belts travelling in the direction of withdrawing, the improvement comprising
    means for positioning said travelling belts around the periphery and along the axis of said article,
    means for adjusting the positions of said travelling belts toward and away from said said article and hydraulic clamping means for clamping said belts in said adjusted positions,
    cleats affixed to said belts adapted to engage said periphery,
    separate drive means and separate control means therefor for each travelling belt with feedback from said drive means to said control means,
    means for ascertaining the speed of each travelling belt,
    microprocessor means for receiving said ascertained speed of each belt, and
    servo control means connecting said microprocessor means with each said control means,
    said microprocessor means being adapted to adjust said servo control means to a pre-selected value so as to equalize the travel of said travelling belts.

2. The apparatus of claim 1 including a reservoir for said hydraulic fluid, means for measuring the temperature, level, and pressure of said hydraulic fluid in said reservoir, and individual means for controlling the clamping of each said belt so as to release said clamping means of said belt if the temperature, level, or pressure of said hydraulic fluid reaches a value which causes said clamped belt to maintain a speed other than the speed of said article.

* * * * *